United States Patent
Sudeji (10) Patent No.: US 11,867,873 B2
(45) Date of Patent: Jan. 9, 2024

(54) METHOD FOR PRODUCING MULTILAYER OPTICAL FILM

(71) Applicant: ZEON CORPORATION, Tokyo (JP)

(72) Inventor: Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/444,595

(22) Filed: Aug. 6, 2021

(65) Prior Publication Data
US 2021/0364672 A1    Nov. 25, 2021

Related U.S. Application Data

(63) Continuation of application No. 16/083,988, filed as application No. PCT/JP2017/011854 on Mar. 23, 2017, now abandoned.

(30) Foreign Application Priority Data

Mar. 29, 2016    (JP) .................. 2016-065094

(51) Int. Cl.
  *B32B 7/06*    (2019.01)
  *G02B 1/04*    (2006.01)
  (Continued)

(52) U.S. Cl.
  CPC .................. *G02B 1/04* (2013.01); *B32B 7/06* (2013.01); *B32B 27/08* (2013.01); *B32B 27/20* (2013.01);
  (Continued)

(58) Field of Classification Search
  CPC .................. C08L 23/18; B32B 2250/02; B32B 2264/101; B32B 2307/746; B32B 27/08;
  (Continued)

(56) References Cited

U.S. PATENT DOCUMENTS

2004/0076844 A1* 4/2004 Tojo ..................... B32B 7/12
                                                                428/411.1
2006/0093809 A1   5/2006 Hebrink et al.
(Continued)

FOREIGN PATENT DOCUMENTS

CN    101052902 A    10/2007
CN    104099045 A    10/2014
(Continued)

OTHER PUBLICATIONS

Machine translation of JP-2014198809-A, retrieved Feb. 16, 2023. (Year: 2014).*
(Continued)

*Primary Examiner* — Callie E Shosho
*Assistant Examiner* — Krupa Shukla
(74) *Attorney, Agent, or Firm* — KENJA IP LAW PC (57) ABSTRACT

A multilayer optical film including: an A layer formed of an alicyclic structure-containing polymer resin; and a B layer disposed on at least one surface of the A layer to be in direct contact therewith, the B layer serving as a masking layer, wherein the B layer is a cured product of a material Y including a dispersion of a crosslinkable polymer (a) and solid particles (b), and the B layer has a thickness tB of 10 μm or more and 25 μm or less. A production method including the steps of applying the material Y onto a surface of the A layer, to form a layer of the material Y; and curing the layer of the material Y.

13 Claims, 1 Drawing Sheet

(51) Int. Cl.
| | |
|---|---|
| *B32B 27/08* | (2006.01) |
| *B32B 27/20* | (2006.01) |
| *B32B 27/32* | (2006.01) |
| *G02B 5/30* | (2006.01) |
| *C08J 7/04* | (2020.01) |

(52) U.S. Cl.
CPC ............ *B32B 27/32* (2013.01); *C08J 7/0427* (2020.01); *G02B 5/30* (2013.01); *B32B 2250/02* (2013.01); *B32B 2264/101* (2013.01); *B32B 2307/746* (2013.01); *C08J 2387/00* (2013.01); *C08J 2433/08* (2013.01)

(58) Field of Classification Search
CPC . B32B 27/20; B32B 27/32; B32B 7/06; C08J 2387/00; C08J 2433/08; C08J 7/0427
See application file for complete search history.

(56) References Cited

U.S. PATENT DOCUMENTS

| | | |
|---|---|---|
| 2014/0302314 A1 | 10/2014 | Takashima et al. |
| 2016/0326405 A1 | 11/2016 | Ii et al. |

FOREIGN PATENT DOCUMENTS

| | | | |
|---|---|---|---|
| JP | 2014198809 A | * | 10/2014 |
| JP | 2014198809 A | | 10/2014 |
| JP | 2015125340 A | | 7/2015 |
| JP | 2016190373 A | | 11/2016 |
| WO | 2015098714 A1 | | 7/2015 |
| WO | 2015119042 A1 | | 8/2015 |

OTHER PUBLICATIONS

Jun. 13, 2017, International Search Report issued in the International Patent Application No. PCT/JP2017/011854.

Machine translation of JP-2014198809-A, retrieved May 13, 2021. (Year: 2014).

Machine translation of WO-2015119042-A1, retrieved May 13, 2021. (Year: 2015).

Oct. 2, 2018, International Preliminary Report on Patentability issued in the International Patent Application No. PCT/JP2017/011854.

* cited by examiner

METHOD FOR PRODUCING MULTILAYER OPTICAL FILM

CROSS-REFERENCE TO RELATED APPLICATION

The present application is a continuation application of U.S. patent application Ser. No. 16/083,988 filed Sep. 11, 2018, now abandoned, which is a National Stage Application of PCT/JP2017/011854 filed Mar. 23, 2017, which claims priority of Japanese Patent Application No. 2016-065094 filed Mar. 29, 2016. The disclosures of the prior applications are hereby incorporated by reference herein in their entirety.

FIELD

The present invention relates to a multilayer optical film and a method for producing the same.

BACKGROUND

An industrially mass-produced film for optical use is generally produced as a long-length film, and stored and transported in a state of a wound body in which the film is wound in a roll form. In such a wound body, the film, which is wound so as to be layered on each other, is brought into contact with the layered surface at a high pressure, thus possibly causing undesirable phenomena. Examples of such phenomena may include a blocking (a phenomenon in which films in contact with each other stick together), an occurrence of a scratch scar on a film surface, and a change in optical properties of a film. In order to prevent such undesirable phenomena, a long-length optical film is bonded to another long-length film called a masking film and a resulting bonded product is wound, thereby protecting the optical film. For example, it is known that a long-length film made of an alicyclic structure-containing polymer resin, which is used as an optical film, is bonded to a long-length masking film and a resulting product is wound to form a wound body (for example, Patent Literature 1). Upon the use of the optical film, the film is unwound from the wound body and then the masking film is peeled off. As the material of the masking film, a resin such as polyethylene and polyethylene terephthalate is commonly used.

CITATION LIST

Patent Literature

Patent Literature 1: Japanese Patent Application Laid-Open No. 2015-125340 A

SUMMARY

Technical Problem

When the optical film is bonded to the masking film, a production line that handles a plurality of long-length films is required and it takes cost to prepare the masking film prior to the bonding. Thus, the challenge is to reduce the cost required for masking.

A film made of a resin such as polyethylene and polyethylene terephthalate that is used in prior art as the masking film may occasionally have a minute concavo-convex shape on its surface. When a film having such a concavo-convex shape is used as the masking film, the concavo-convex shape is sometimes transferred to the optical film to form an undesirable concavo-convex shape that is called an orange peel on a surface of the optical film. An attempt to obtain a masking film on which such a concavo-convex shape is reduced would further increase the cost for preparing the masking film.

The film made of a resin such as polyethylene and polyethylene terephthalate and that is used in prior art as the masking film may have a large phase difference or a low light transmittance. In such cases, the optical properties of the optical film cannot be easily measured in a state where the optical film is bonded to the masking film, thus restricting the flexibility of an operation in a quality control of the optical film. An attempt to obtain a masking film having a small phase difference and a high light transmittance would further increase the cost for preparing the masking film.

Furthermore, as the fundamental property, the masking film needs to be easily and stably peelable from the protection object film.

Thus, an object of the present invention is to provide a multilayer optical film and a method of producing the multilayer optical film capable of achieving masking that can be easily and stably peeled off at a low cost without the occurrence of a defect such as undesirable transfer of a concavo-convex shape, while imposing little restriction on a quality control of the optical film.

Solution to Problem

The present inventor has conducted studies in order to solve the above-mentioned problem and came up with an idea that a material in a liquid state is applied onto a surface of an optical film and then cured to form a layer exhibiting a masking effect instead of bonding a previously prepared masking film thereto. The present inventor has further conducted studies and found that employment of a specific material as a layer capable of exhibiting such a masking function with an alicyclic structure-containing polymer resin can result in an excellent masking layer. The present invention thus has been completed on the basis of the above-described findings.

That is, the present invention is as follows.

(1) A multilayer optical film comprising:
 an A layer formed of an alicyclic structure-containing polymer resin; and
 a B layer disposed on at least one surface of the A layer to be in direct contact therewith, the B layer serving as a masking layer, wherein
 the B layer is a cured product of a material Y including a dispersion of a crosslinkable polymer (a) and solid particles (b),
 the B layer has a thickness tB of 10 μm or more and 25 μm or less, and
 the crosslinkable polymer (a) has a glass transition temperature of 0° C. or higher and 40° C. or lower.

(2) The multilayer optical film according to (1), wherein the solid particles (b) is particles of a material selected from the group consisting of silica, alumina, and a mixture thereof.

(3) The multilayer optical film according to (1) or (2), wherein the solid particles (b) have a volume-average particle diameter db satisfying a relationship of $0.02 \leq db/tB \leq 0.3$.

(4) The multilayer optical film according to any one of (1) to (3), wherein the crosslinkable polymer (a) contains a crosslikable group selected from the group consisting of a methylol group, a vinyl group, an epoxy group, and a combination thereof.

(5) The multilayer optical film according to any one of (1) to (4), wherein the B layer has a tensile elastic modulus EB satisfying 500 MPa≤EB≤2,200 MPa.

(6) The multilayer optical film according to any one of (1) to (5), wherein the B layer has a breaking elongation εB satisfying 10%≤εB≤300%.

(7) The multilayer optical film according to any one of (1) to (6), wherein a contact angle of the material Y on a surface of the A layer is 30 degrees or less.

(8) A method of producing the multilayer optical film according to any one of (1) to (7), comprising the steps of:

applying the material Y including the dispersion of the crosslinkable polymer (a), and the solid particles (b) onto a surface of the A layer, to form a layer of the material Y; and curing the layer of the material Y.

Advantageous Effects of Invention

The multilayer optical film of the present invention can provide a film in which: the masking can be achieved at a low cost; the occurrence of a defect such as undesirable transfer of a concavo-convex shape is prevented; the masking can be easily and stably peeled off; and there is little restriction on a quality control of the optical film. Further, according to the method of producing the multilayer optical film of the present invention, such a multilayer optical film of the present invention can be easily produced.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the long-length film may be, but not particularly limited to, for example 100,000 times or less the width.

In the following description, the terms "(meth)acrylic-", "(meth)acrylate", and the like mean acrylic-, methacrylic-, and combinations of these. For example, (meth)acrylate means any of acrylate, methacrylate, and combinations of these.

In the following description, for the sake of explanation, a "solvent" is used as a term which includes not only a medium that constitutes a solution in which a solute is dissolved, but also a medium that constitutes a dispersing element in which a dispersed substance is dispersed, and a medium in which a solute is dissolved and a dispersed substance is dispersed as well, unless otherwise stated.

In the following description, an in-plane retardation Re of a film is a value represented by Re=(nx−ny)×d, unless otherwise specified. A retardation Rth in the thickness direction of a film is a value represented by Rth=[(nx+ny)/2−nz]×d, unless otherwise specified. Herein, nx represents a refractive index in a direction which, among directions perpendicular to the thickness direction of the film (in-plane directions), gives the maximum refractive index. ny represents a refractive index in a direction among the above-mentioned in-plane directions which is orthogonal to the direction giving nx. nz represents a refractive index in the thickness direction, and d represents the thickness of the layer. The measurement wavelength of the retardation is 590 nm unless otherwise specified. An in-plane retardation Re and a thickness-direction retardation Rth of a film may be measured by, for example, using an automatic refractometer ("KOBRA-21ADH" manufactured by Oji Scientific Instruments).

[1. Summary of Multilayer Optical Film]

The multilayer optical film of the present invention includes an A layer formed of an alicyclic structure-containing polymer resin, and a B layer disposed on at least one surface of the A layer to be in direct contact therewith.

Figure 1:
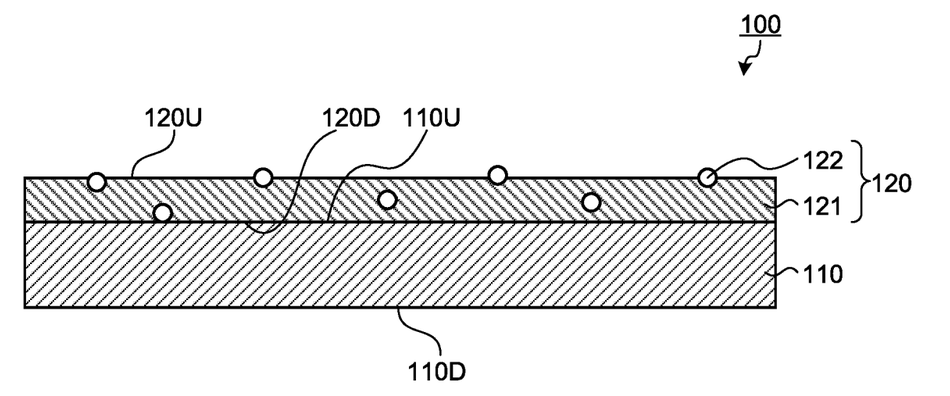
FIG. 1 is a cross-sectional view schematically illustrating an example of a multilayer optical film according to the present invention.

FIG. 1 is a cross-sectional view schematically illustrating an example of a multilayer optical film according to the present invention. In FIG. 1, the multilayer optical film 100 includes an A layer 110, and a B layer 120 disposed on one surface 110U of the A layer 110 to be in direct contact therewith. The B layer 120 includes a cured product 121 of a crosslinkable polymer (a), and solid particles (b) 122. When such a multilayer optical film is produced, for example, as a film having a long-length shape and wound such that the surface 120U on the B layer side faces the outside, the multilayer optical film 100 is in contact with each other at a high pressure inside the wound body. That is, the surface 120U of the multilayer optical film 100 and the surface 110D on the A layer side of the multilayer optical film 100, adjacent to an outer peripheral side of the surface 120U, are in contact with each other at a high pressure. The multilayer optical film of the present invention has a specific configuration as described below and thus can prevent undesirable phenomena such as a blocking, the occurrence of a scratch scar on the surface of the A layer, and a change in optical properties of the A layer.

[2. A Layer]

The A layer is formed of an alicyclic structure-containing polymer resin. The alicyclic structure-containing polymer resin is a resin containing an alicyclic structure-containing polymer. Examples of the alicyclic structure-containing polymer may include a crystallizable alicyclic structure-containing polymer, an amorphous alicyclic structure-containing polymer, and an alicyclic structure-containing polymer that is a hydrogenated product [D] of a specific block copolymer.

[2.1. Crystallizable Alicyclic Structure-Containing Polymer]

A polymer having crystallizability refers to a polymer having a melting point (specifically, a melting point thereof can be observed by a differential scanning calorimeter (DSC)).

The alicyclic structure-containing polymer is a polymer having an alicyclic structure in the molecule, and represents a polymer that can be obtained by a polymerization reaction using a cyclic olefin as a monomer or a hydrogenated product thereof. Since the alicyclic structure-containing polymer having crystallizability has excellent heat resistance and low hygroscopicity, a film suitable for optical applications can be achieved. As the alicyclic structure-containing polymer, one type thereof may be solely used, and two or more types thereof may also be used in combination at any ratio.

Examples of the alicyclic structure contained in the alicyclic structure-containing polymer may include a cycloalkane structure and a cycloalkene structure. Among these, a cycloalkane structure is preferable since a film having excellent properties such as thermal stability is easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

In the alicyclic structure-containing polymer, the ratio of the structural unit having an alicyclic structure relative to all structural units is preferably 30% by weight or more, more preferably 50% by weight or more, and particularly preferably 70% by weight or more. When the ratio of the structural unit having an alicyclic structure in the alicyclic structure-containing polymer is at a high level as described above, heat resistance can be enhanced.

In the alicyclic structure-containing polymer, the rest of the structural unit having an alicyclic structure is not especially limited, and may be appropriately selected depending on the purposes of use.

Examples of the crystallizable alicyclic structure-containing polymer may include the following polymer ($\alpha$) to polymer ($\delta$). Among these, it is preferable that the crystallizable alicyclic structure-containing polymer is a polymer ($\beta$) since a film having excellent heat resistance is easily obtained.

Polymer ($\alpha$): a ring-opening polymer of a cyclic olefin monomer, having crystallizability
Polymer ($\beta$): a hydrogenated product of the polymer ($\alpha$), having crystallizability
Polymer ($\gamma$): an addition polymer of a cyclic olefin monomer, having crystallizability
Polymer ($\delta$): a hydrogenated product of the polymer ($\gamma$), having crystallizability Specifically, the alicyclic structure-containing polymer is more preferably a ring-opening polymer of dicyclopentadiene having crystallizability, or a hydrogenated product of the ring-opening polymer of dicyclopentadiene having crystallizability, and particularly preferably a hydrogenated product of the ring-opening polymer of dicyclopentadiene having crystallizability. Herein, the ring-opening polymer of dicyclopentadiene means a polymer in which the ratio of a structural unit derived from dicyclopentadiene relative to all structural units is usually 50% by weight or more, preferably 70% by weight or more, more preferably 90% by weight or more, and further preferably 100% by weight.

Hereinafter, methods for producing the polymers ($\alpha$) and ($\beta$) will be described.

The cyclic olefin monomer available in production of the polymers ($\alpha$) and ($\beta$) is a compound which has a ring structure of carbon atoms and includes a carbon-carbon double bond in the ring. Examples of the cyclic olefin monomer may include a norbornene-based monomer. When the polymer ($\alpha$) is a copolymer, a monocyclic cyclic olefin may be used as the cyclic olefin monomer.

The norbornene-based monomer is a monomer containing a norbornene ring. Examples of the norbornene-based monomer may include a bicyclic monomer such as bicyclo[2.2.1]hept-2-ene (common name: norbornene) and 5-ethylidene-bicyclo[2.2.1]hept-2-ene (common name: ethylidene norbornene) and derivatives thereof (for example, those with a substituent on the ring); a tricyclic monomer such as tricyclo[4.3.0.1$^{2,5}$]deca-3,7-diene (common name: dicyclopentadiene) and derivatives thereof; and a tetracyclic monomer such as 7,8-benzotricyclo[4.3.0.1$^{2,5}$]dec-3-ene (common name: methanotetrahydrofluorene: also referred to as 1,4-methano-1,4,4a,9a-tetrahydrofluorene) and derivatives thereof, tetracyclo[4.4.0.1$^{2,5}$.1$^{7,10}$]dodec-3-ene (common name: tetracyclododecene), and 8-ethylidenetetracyclo[4.4.0.1$^{2,5}$.1$^{7,10}$]-3-dodecene and derivatives thereof.

Examples of the substituent in the aforementioned monomer may include: an alkyl group such as a methyl group and an ethyl group; an alkenyl group such as a vinyl group; an alkylidene group such as propane-2-ylidene; an aryl group such as a phenyl group; a hydroxy group; an acid anhydride group; a carboxyl group; and an alkoxycarbonyl group such as a methoxycarbonyl group. As the aforementioned substituent, one type thereof may be solely used, and two or more types thereof may also be used in combination at any ratio.

Examples of the monocyclic olefin may include cyclic monoolefins such as cyclobutene, cyclopentene, methylcyclopentene, cyclohexene, methylcyclohexene, cycloheptene, and cyclooctene; and cyclic diolefins such as cyclohexadiene, methylcyclohexadiene, cyclooctadiene, methylcyclooctadiene, and phenylcyclooctadiene.

As the cyclic olefin monomer, one type thereof may be solely used, and two or more types thereof may also be used in combination at any ratio. When two or more types of the cyclic olefin monomers are used, the polymer ($\alpha$) may be a block copolymer or a random copolymer.

Some of the cyclic olefin monomers may allow presence of endo- and exo-stereoisomers. As the cyclic olefin monomer, any of the endo- and exo-isomers may be used. One of the endo- and exo-isomers may be solely used, and an isomer mixture containing the endo- and exo-isomers at any ratio may also be used. In particular, it is preferable that the ratio of one of the endo- and exo-isomers is at a high level because crystallizability of the alicyclic structure-containing polymer is thereby enhanced and a film having excellent heat resistance can thereby be easily obtained. For example, the ratio of the endo- or exo-isomer is preferably 80% or more, more preferably 90% or more, and further preferably 95% or more. It is preferable that the ratio of the endo-isomer is high because it can be easily synthesized.

The crystallizability of the polymer ($\alpha$) and the polymer ($\beta$) may be increased by increasing the degree of syndiotactic stereoregularity thereof (the ratio of the racemo diad). From the viewpoint of increasing the degree of stereoregularity of the polymer ($\alpha$) and the polymer ($\beta$), the ratio of the racemo diad in the structural units of the polymer ($\alpha$) and the polymer ($\beta$) is preferably 51% or more, more preferably 60% or more, and particularly preferably 70% or more.

The ratio of the racemo diad may be measured by $^{13}$C-NMR spectrum analysis. Specifically, the measurement may be performed by the following method.

The $^{13}$C-NMR measurement of a polymer sample is performed at 200° C. with ortho-dichlorobenzene-d$^4$ as a solvent by an inverse-gated decoupling method. From the result of this $^{13}$C-NMR measurement, the ratio of the racemo diad of the polymer sample may be determined. Specifically, a signal at 43.35 ppm derived from the meso diad and a signal at 43.43 ppm derived from the racemo diad may be identified with the peak at 127.5 ppm of ortho-dichlorobenzene-d$^4$ as the reference shift, and the ratio of the racemo diad of the polymer sample may be determined on the basis of the ratio of the signal strength of these signals.

In synthesis of the polymer (α), a ring-opening polymerization catalyst is usually used. As the ring-opening polymerization catalyst, one type thereof may be solely used, and two or more types thereof may also be used in combination at any ratio. It is preferable that such a ring-opening polymerization catalyst for synthesis of the polymer (α) is a ring-opening polymerization catalyst that may cause ring-opening polymerization of the cyclic olefin monomer to produce a ring-opening polymer having syndiotactic stereoregularity. Preferable examples of the ring-opening polymerization catalyst may include ring-opening polymerization catalysts including a metal compound represented by the following formula (A):

$$M(NR^1)X_{4-a}(OR^2)_a \cdot L_b \qquad (A)$$

(In the formula (A),

M is a metal atom selected from the group consisting of the Group 6 transition metal atoms in the periodic table, $R^1$ is a phenyl group optionally having a substituent at at least one of 3-, 4-, and 5-positions, or a group represented by —$CH_2R^3$ (wherein $R^3$ is a group selected from the group consisting of a hydrogen atom, an alkyl group optionally having a substituent, and an aryl group optionally having a substituent), $R^2$ is a group selected from the group consisting of an alkyl group optionally having a substituent and an aryl group optionally having a substituent, X is a group selected from the group consisting of a halogen atom, an alkyl group optionally having a substituent, an aryl group optionally having a substituent, and an alkylsilyl group, L is a neutral electron donor ligand, a is a number of 0 or 1, and b is an integer of 0 to 2.)

In the formula (A), M is a metal atom selected from the group consisting of the Group 6 transition metal atoms in the periodic table. M is preferably chromium, molybdenum, or tungsten, more preferably molybdenum or tungsten, and particularly preferably tungsten.

In the formula (A), $R^1$ is a phenyl group optionally having a substituent at at least one of the 3-, 4-, and 5-positions, or a group represented by —$CH_2R^3$.

The number of carbon atoms of the phenyl group optionally having a substituent at at least one of the 3-, 4-, and 5-positions of $R^1$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio. In $R^1$, the substituents present at at least two of the 3-, 4-, and 5-positions may be bonded to each other, to form a ring structure.

Examples of the phenyl group optionally having a substituent at at least one of the 3-, 4-, and 5-positions may include an unsubstituted phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group, and a 3,4,5-trichlorophenyl group; and a 2-naphthyl group optionally having a substituent such as a 2-naphthyl group, a 3-methyl-2-naphthyl group, and a 4-methyl-2-naphthyl group.

In the group represented by —$CH_2R^3$ of $R^1$, $R^3$ is a group selected from the group consisting of a hydrogen atom, an alkyl group optionally having a substituent, and an aryl group optionally having a substituent.

The number of carbon atoms in the alkyl group optionally having a substituent of $R^3$ is preferably 1 to 20, and more preferably 1 to 10. This alkyl group may be either linear or branched. Examples of the substituent may include a phenyl group optionally having a substituent such as a phenyl group and a 4-methylphenyl group; and an alkoxyl group such as a methoxy group and an ethoxy group. As the substituent, one type thereof may be solely used, and two or more types thereof may also be used in combination at any ratio.

Examples of the alkyl group optionally having a substituent of $R^3$ may include a methyl group, an ethyl group, a propyl group, an isopropyl group, a butyl group, an isobutyl group, a t-butyl group, a pentyl group, a neopentyl group, a benzyl group, and a neophyl group.

The number of carbon atoms in the aryl group optionally having a substituent of $R^3$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio.

Examples of the aryl group optionally having a substituent of $R^3$ may include a phenyl group, a 1-naphthyl group, a 2-naphthyl group, a 4-methylphenyl group, and a 2,6-dimethylphenyl group.

Among these, the group represented by $R^3$ is preferably an alkyl group of 1 to 20 carbon atoms.

In the formula (A), $R^2$ is a group selected from the group consisting of an alkyl group optionally having a substituent and an aryl group optionally having a substituent. As the alkyl group optionally having a substituent and the aryl group optionally having a substituent of $R^2$, a group selected from groups shown as the alkyl groups optionally having a substituent and the aryl groups optionally having a substituent, respectively, of $R^3$ may be optionally used.

In the formula (A), X is a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

As the alkyl group optionally having a substituent and the aryl group optionally having a substituent of X, a group selected from groups shown as the alkyl groups optionally having a substituent and the aryl groups optionally having a substituent, respectively, of $R^3$ may be optionally used.

Examples of the alkylsilyl group of X may include a trimethylsilyl group, a triethylsilyl group, and a t-butyldimethylsilyl group.

When the metal compound represented by the formula (A) has two or more X's in one molecule, the X's may be the same as or different from each other. Further, the two or more X's may be bonded to each other to form a ring structure.

In the formula (A), L is a neutral electron donor ligand.

Examples of the neutral electron donor ligand of L may include an electron donor compound containing an atom of the Group 14 or 15 in the periodic table. Specific examples thereof may include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Among these, ethers are preferable. When the metal compound represented by the formula (A) has two or more L's in one molecule, the L's may be the same as or different from each other.

The metal compound represented by the formula (A) is preferably a tungsten compound having a phenylimido group. That is, a metal compound represented by the formula (A) wherein M is a tungsten atom and $R^1$ is a phenyl group is preferable. In particular, a tetrachlorotungsten phenylimide(tetrahydrofuran) complex is more preferable.

The method for producing the metal compound represented by the formula (A) is not particularly limited. For example, as described in Japanese Patent Application Laid-Open No. Hei. 5-345817 A, the metal compound represented by the formula (A) may be produced by mixing an oxyhalogenated product of a Group 6 transition metal; a phenyl isocyanate optionally having a substituent at at least one of the 3-, 4-, and 5-positions or a monosubstituted methyl isocyanate; a neutral electron donor ligand (L); and if necessary, an alcohol, a metal alkoxide, and a metal aryloxide.

In the aforementioned production method, the metal compound represented by the formula (A) is usually obtained in a state where the compound is contained in a reaction liquid. After production of the metal compound, the aforementioned reaction liquid as it is may be used as a catalyst liquid for the ring-opening polymerization reaction. Alternatively, the metal compound may be isolated from the reaction liquid and purified by a purification treatment such as crystallization, and the resulting metal compound may be used for the ring-opening polymerization reaction.

As the ring-opening polymerization catalyst, the metal compound represented by the formula (A) may be solely used. Alternatively, the metal compound represented by the formula (A) may be used in combination with another component. For example, the metal compound represented by the formula (A) may be used in combination with an organometallic reductant, to improve polymerization activity.

Examples of the organometallic reductant may include organometallic compounds of Groups 1, 2, 12, 13, and 14 in the periodic table, having a hydrocarbon group of 1 to 20 carbon atoms. Examples of such organometallic compounds may include an organolithium such as methyllithium, n-butyllithium, and phenyllithium; an organomagnesium such as butylethylmagnesium, butyloctylmagnesium, dihexylmagnesium, ethylmagnesium chloride, n-butylmagnesium chloride, and allylmagnesium bromide; an organozinc such as dimethylzinc, diethylzinc, and diphenylzinc; an organoaluminum such as trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, and isobutylaluminum diisobutoxide; and an organotin such as tetramethyltin, tetra(n-butyl)tin, and tetraphenyltin. Among these, an organoaluminum and an organotin are preferable. As the organometallic reductant, one type thereof may be solely used, and two or more types thereof may also be used in combination at any ratio.

The ring-opening polymerization reaction is usually performed in an organic solvent. As the organic solvent, an organic solvent that allows the ring-opening polymer and a hydrogenated product thereof to be dissolved or dispersed under specific conditions and does not inhibit the ring-opening polymerization reaction and a hydrogenation reaction may be used. Examples of such an organic solvent may include an aliphatic hydrocarbon solvent such as pentane, hexane, and heptane; an alicyclic hydrocarbon solvent such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon solvent such as benzene, toluene, and xylene; a halogenated aliphatic hydrocarbon solvent such as dichloromethane, chloroform, and 1,2-dichloroethane; a halogenated aromatic hydrocarbon solvent such as chlorobenzene, and dichlorobenzene; a nitrogen-containing hydrocarbon solvent such as nitromethane, nitrobenzene, and acetonitrile; an ether solvent such as diethyl ether, and tetrahydrofuran; and mixed solvents obtained by a combination thereof. Among these organic solvents, an aromatic hydrocarbon solvent, an aliphatic hydrocarbon solvent, an alicyclic hydrocarbon solvent, and an ether solvent are preferable. As the organic solvent, one type thereof may be solely used, and two or more types thereof may also be used in combination at any ratio.

The ring-opening polymerization reaction may be initiated, for example, by mixing the cyclic olefin monomer, the metal compound represented by the formula (A), and if necessary, the organometallic reductant. The order of mixing these components is not particularly limited. For example, a solution containing the metal compound represented by the formula (A) and the organometallic reductant may be mixed in a solution containing the cyclic olefin monomer. Alternatively, a solution containing the cyclic olefin monomer and the metal compound represented by the formula (A) may be mixed in a solution containing the organometallic reductant. Further, a solution containing the metal compound represented by the formula (A) may be mixed in a solution containing the cyclic olefin monomer and the organometallic reductant. When the respective components are mixed, the total amount of each of the components may be mixed at once, or the components may be mixed in a plurality of batches. The components may also be continuously mixed over a relatively long period of time (for example, 1 or more minutes).

The concentration of the cyclic olefin monomer in the reaction liquid at the time of starting the ring-opening polymerization reaction is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value of the aforementioned range, productivity can be enhanced. When the concentration thereof is equal to or less than the upper limit value, viscosity of the reaction liquid after the ring-opening polymerization reaction can be decreased. Therefore, the subsequent hydrogenation reaction can be facilitated.

The amount of the metal compound represented by the formula (A) used in the ring-opening polymerization reaction is desirably set so that the molar ratio of "metal compound:cyclic olefin monomer" falls within a specific range. Specifically, the aforementioned molar ratio is preferably 1:100 to 1:2,000,000, more preferably 1:500 to 1,000,000, and particularly preferably 1:1,000 to 1:500,000. When the amount of the metal compound is equal to or more than the lower limit value of the aforementioned range, sufficient polymerization activity can be obtained. When the amount thereof is equal to or less than the upper limit value, the metal compound can be easily removed after the reaction.

The amount of the organometallic reductant is preferably 0.1 mol or more, more preferably 0.2 mol or more, and particularly preferably 0.5 mol or more, and is preferably 100 mol or less, more preferably 50 mol or less, and particularly preferably 20 mol or less, relative to 1 mol of the metal compound represented by the formula (A). When the amount of the organometallic reductant is equal to or more than the lower limit value of the aforementioned range, polymerization activity can be sufficiently enhanced. When the amount thereof is equal to or less than the upper limit value, occurrence of a side reaction can be suppressed.

The polymerization reaction system of the polymer (α) may contain an activity adjuster. When the activity adjuster is used, the ring-opening polymerization catalyst can be stabilized, the reaction rate of the ring-opening polymerization reaction can be adjusted, and the molecular weight distribution of the polymer can be adjusted.

As the activity adjuster, an organic compound having a functional group may be used. Examples of the activity adjuster may include an oxygen-containing compound, a nitrogen-containing compound, and a phosphorus-containing organic compound.

Examples of the oxygen-containing compound may include: ethers such as diethyl ether, diisopropyl ether, dibutyl ether, anisole, furan, and tetrahydrofuran; ketones such as acetone, benzophenone, and cyclohexanone; and esters such as ethyl acetate.

Examples of the nitrogen-containing compound may include: nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butylpyridine.

Examples of the phosphorous-containing compound may include: phosphines such as triphenyl phosphine, tricyclohexyl phosphine, triphenyl phosphate, and trimethyl phosphate; and phosphine oxides such as triphenyl phosphine oxide.

As the activity adjuster, one type thereof may be solely used, and two or more types thereof may also be used in combination at any ratio.

The amount of the activity adjuster in the polymerization reaction system of the polymer (α) is preferably 0.01 mol % to 100 mol % relative to 100 mol % of the metal compound represented by the formula (A).

In order to adjust the molecular weight of the polymer (α), the polymerization reaction system of the polymer (α) may contain a molecular weight adjuster. Examples of the molecular weight adjuster may include: α-olefins such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as allyl chloride; a nitrogen-containing vinyl compound such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

As the molecular weight adjuster, one type thereof may be solely used, and two or more types thereof may also be used in combination at any ratio.

The amount of the molecular weight adjuster in the polymerization reaction system for polymerizing the polymer (α) may be appropriately determined depending on an intended molecular weight. The specific amount of the molecular weight adjuster is preferably in a range of 0.1 mol % to 50 mol % relative to the cyclic olefin monomer.

The polymerization temperature is preferably −78° C. or higher, and more preferably −30° C. or higher, and is preferably +200° C. or lower, and more preferably +180° C. or lower.

The polymerization time may be dependent on reaction scale. The specific polymerization time is preferably in a range of 1 minute to 1,000 hours.

By the aforementioned production method, the polymer (α) may be obtained. By hydrogenating this polymer (α), the polymer (β) may be produced.

For example, the polymer (α) may be hydrogenated by supplying hydrogen into the reaction system containing the polymer (α) in the presence of a hydrogenation catalyst in accordance with an ordinary method. When reaction conditions in this hydrogenation reaction are appropriately set, the tacticity of the hydrogenated product is not usually altered by the hydrogenation reaction.

As the hydrogenation catalyst, a homogeneous catalyst or a heterogeneous catalyst that is publicly known as a hydrogenation catalyst for an olefin compound may be used.

Examples of the homogeneous catalyst may include a catalyst including a combination of a transition metal compound and an alkali metal compound such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium; and a noble metal complex catalyst such as dichlorobis(triphenylphosphine)palladium, chlorohydridecarbonyltris(triphenylphosphine)ruthenium, chlorohydridecarbonylbis(tricyclohexylphosphine)ruthenium, bis(tricyclohexylphosphine)benzylidyne ruthenium (IV) dichloride, and chlorotris(triphenylphosphine)rhodium.

Examples of the heterogeneous catalyst may include a metal catalyst such as nickel, palladium, platinum, rhodium, and ruthenium; and a solid catalyst in which the aforementioned metal is supported on a carrier such as carbon, silica, diatomaceous earth, alumina, or titanium oxide such as nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inert organic solvent. Examples of the inert organic solvent may include: an aromatic hydrocarbon solvent such as benzene and toluene; an aliphatic hydrocarbon solvent such as pentane and hexane; an alicyclic hydrocarbon solvent such as cyclohexane and decahydronaphthalene; and an ether solvent such as tetrahydrofuran and ethylene glycol dimethyl ether. As the inert organic solvent, one type thereof may be solely used, and two or more types thereof may also be used in combination at any ratio. The inert organic solvent may be the same as or different from the organic solvent used in the ring-opening polymerization reaction. Furthermore, the hydrogenation reaction may be performed by mixing the hydrogenation catalyst in the reaction liquid of the ring-opening polymerization reaction.

The reaction conditions for the hydrogenation reaction usually vary depending on the hydrogenation catalyst used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or higher than the lower limit value of the aforementioned range, the reaction rate can be increased. When the reaction temperature is equal to or lower than the upper limit value, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value of the aforementioned range, the reaction rate can be increased. When the hydrogen pressure is equal to or less than the upper limit value, a special apparatus such as a high pressure resistant reaction vessel is not required, and thereby facility costs can be reduced.

The reaction time of the hydrogenation reaction may be set to any time period during which a desired hydrogenation rate is achieved, and preferably 0.1 hour to 10 hours.

After the hydrogenation reaction, the polymer (β), which is the hydrogenated product of the polymer (α), is usually collected in accordance with an ordinary method.

The hydrogenation rate (the ratio of a hydrogenated main-chain double bond) in the hydrogenation reaction is preferably 98% or more, and more preferably 99% or more. As the hydrogenation rate becomes higher, the heat resistance of the alicyclic structure-containing polymer can be made more favorable.

Herein, the hydrogenation rate of the polymer may be measured by a $^1$H-NMR measurement at 145° C. with o-dichlorobenzene-$d^4$ as a solvent.

Subsequently, the method for producing the polymer (γ) and the polymer (δ) will be described.

The cyclic olefin monomer to be used for producing the polymers (γ) and (δ) may be optionally selected from the range shown as the cyclic olefin monomers to be used for producing the polymer (α) and the polymer (β). As the cyclic olefin monomer, one type thereof may be solely used, and two or more types thereof may also be used in combination at any ratio.

In the production of the polymer (γ), an optional monomer which is copolymerizable with a cyclic olefin monomer may be used as a monomer in combination with the cyclic olefin monomer. Examples of the optional monomer may include: α-olefins of 2 to 20 carbon atoms such as ethylene, propylene, 1-butene, 1-pentene, and 1-hexene; aromatic ring vinyl compounds such as styrene and α-methylstyrene; and non-conjugated dienes such as 1,4-hexadiene, 4-methyl-1,4-hexadiene, 5-methyl-1,4-hexadiene, and 1,7-octadiene. Among these, an α-olefin is preferable, and ethylene is more preferable. As the optional monomer, one type thereof may be solely used, and two or more types thereof may also be used in combination at any ratio.

The ratio between the cyclic olefin monomer and the optional monomer in terms of a weight ratio (cyclic olefin monomer:optional monomer) is preferably 30:70 to 99:1, more preferably 50:50 to 97:3, and particularly preferably 70:30 to 95:5.

When two or more types of the cyclic olefin monomers are used, or when the cyclic olefin monomer and the optional monomer are used in combination, the polymer (γ) may be a block copolymer, or a random copolymer.

For the synthesis of the polymer (γ), an addition polymerization catalyst is usually used. Examples of the addition polymerization catalyst may include a vanadium-based catalyst formed from a vanadium compound and an organoaluminum compound, a titanium-based catalyst formed from a titanium compound and an organoaluminum compound, and a zirconium-based catalyst formed from a zirconium complex and aluminoxane. As the addition polymerization catalyst, one type thereof may be solely used, and two or more types thereof may also be used in combination at any ratio.

The amount of the addition polymerization catalyst is preferably 0.000001 mol or more, and more preferably 0.00001 mol or more, and is preferably 0.1 mol or less, and more preferably 0.01 mol or less, relative to 1 mol of a monomer.

The addition polymerization of the cyclic olefin monomer is usually performed in an organic solvent. The organic solvent may be optionally selected from the range shown as the organic solvents to be used for the ring-opening polymerization of a cyclic olefin monomer. As the organic solvent, one type thereof may be solely used, and two or more types thereof may also be used in combination at any ratio.

The polymerization temperature in the polymerization for producing the polymer (γ) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

By the aforementioned production method, the polymer (γ) may be obtained. By hydrogenating this polymer (γ), the polymer (δ) may be produced.

The hydrogenation of the polymer (γ) may be performed by the same method as the method previously described as the method for hydrogenating the polymer (α).

When the A layer contains the crystallizable polymer as the alicyclic structure-containing polymer, the crystallization degree thereof is preferably 1% or more, more preferably 2% or more, and particularly preferably 3% or more. When the polymer has such a high crystallization degree, the A layer can have high heat resistance and chemical resistance. The upper limit of the crystallization degree of the polymer having crystallizability is not particularly limited, but is preferably 70% or less, more preferably 60% or less, and particularly preferably 50% or less. When the crystallization degree is equal to or less than the aforementioned upper limit value, the transparency of the A layer may be easily made favorable. The crystallization degree of a polymer may be measured by an X-ray diffraction method.

The melting point of the polymer having crystallizability is preferably 200° C. or higher, and more preferably 230° C. or higher, and is preferably 290° C. or lower. When the polymer having such a melting point is used, the A layer having an excellent balance of moldability and heat resistance can be obtained.

The weight-average molecular weight (Mw) of the polymer having crystallizability is preferably 1,000 or more, and more preferably 2,000 or more, and is preferably 1,000,000 or less, and more preferably 500,000 or less. The polymer having such a weight-average molecular weight has an excellent balance of molding processability and heat resistance.

The molecular weight distribution (Mw/Mn) of the polymer having crystallizability is preferably 1.0 or more, and more preferably 1.5 or more, and is preferably 4.0 or less, and more preferably 3.5 or less. Herein, Mn represents a number-average molecular weight. The polymer having such a molecular weight distribution is excellent in molding processability.

The weight-average molecular weight (Mw) and the molecular weight distribution (Mw/Mn) of the polymer having crystallizability may be measured as a polystyrene-equivalent value by gel permeation chromatography (GPC) using tetrahydrofuran as a development solvent.

[2.2. Amorphous Alicyclic Structure-Containing Polymer]

The amorphous alicyclic structure-containing polymer is one having no crystallizability among the above-described alicyclic structure-containing polymers. Examples of the monomers constituting the amorphous alicyclic structure-containing polymer may include the same ones as the examples of the monomers constituting the crystallizable alicyclic structure-containing polymer described above. The amorphous alicyclic structure-containing polymer may be produced by polymerizing the above-mentioned monomers by a known polymerization method to obtain a polymer having a low degree of syndiotactic stereoregularity, a usual atactic polymer, or an isotactic polymer. The mode of polymerization may be either ring-opening polymerization or addition polymerization.

As a resin containing an amorphous alicyclic structure-containing polymer, commercially available products may be used. Examples of such products may include "ZEONOR" manufactured by ZEON Corporation, "ARTON" manufactured by JSR Corporation, "TOPAS" manufactured by TOPAS ADVANCED POLYMERS, and "APEL" manufactured by Mitsui Chemicals, Inc.

[2.3. Hydrogenated Product [D] of Block Copolymer]

The hydrogenated product [D] of the block copolymer, which is an example of the alicyclic structure-containing polymer in the present invention, is formed by hydrogenating a specific block copolymer [C]. The block copolymer [C] includes two or more specific polymer blocks [A] per molecule and one or more specific polymer blocks [B] per molecule. The hydrogenated product [D] of the block copolymer may be crystallizable or amorphous, but is usually amorphous.

[2.3.1. Polymer Block [A]]

The polymer block [A] has a repeating unit [I] derived from an aromatic vinyl compound as a main component. In the present application, a unit derived from a certain compound is a unit having a structure obtained by polymerization of the compound. The containing ratio of the repeating unit [I] derived from the aromatic vinyl compound in the polymer block [A] is preferably 98% by weight or more, and more preferably 99% by weight or more. Examples of the repeating units other than the repeating unit [I] derived from the aromatic vinyl compound of the polymer block [A] may include repeating units [II] derived from a chain conjugated diene and repeating units [III] derived from other vinyl compounds (i.e., compounds which are vinyl compounds and which are neither aromatic vinyl compounds nor chain conjugated diene compounds). The containing ratio thereof is preferably 2% by weight or less, and more preferably 1% by weight or less.

When the containing ratio of the component of the repeating unit [II] derived from the chain conjugated diene and/or the repeating unit [III] derived from another vinyl compound in the polymer block [A] is equal to or less than the aforementioned lower limit value, the heat resistance of the A layer can be improved. The two polymer blocks [A] included in the block copolymer [C] may be the same as or different from each other as long as they satisfy the above-described range.

[2.3.2. Polymer Block [B]]

The polymer block [B] includes as the main component the repeating unit [II] derived from the chain conjugated diene compound, or includes as the main component the repeating unit [I] derived from the aromatic vinyl compound and the repeating unit [II] derived from the chain conjugated diene compound. The ratio of the weight fraction w[IB] of the repeating unit [I] and the weight fraction w[IIB] of the repeating unit [II], i.e., w[IB]/w[IIB], in the polymer block [B] is preferably 50/50 or less, more preferably 45/55 or less, and still more preferably 40/60 or less, and is preferably 0/100 or more, more preferably 5/95 or more, and still more preferably 10/90 or more.

The total containing ratio of the repeating units [I] and [II] in the polymer block [B] is preferably 95% by weight or more, more preferably 97% by weight or more, and even more preferably 99% by weight or more. Examples of components other than the repeating unit [I] and the repeating unit [II] in the polymer block [B] may include repeating units [III] derived from other vinyl compounds. The containing ratio thereof is preferably 5% by weight or less, more preferably 3% by weight or less, and even more preferably 1% by weight or less.

When the containing ratio of the repeating unit [I] and the repeating unit [II] in the polymer block [B] falls within the aforementioned range, mechanical strength and flexibility of the A layer containing the hydrogenated product [D] of the block copolymer can be improved, and heat resistance against the phase difference change can be improved.

[2.3.3. Aromatic Vinyl Compound]

Examples of aromatic vinyl compounds include styrene; styrene; styrenes having an alkyl group of 1 to 6 carbon atoms as a substituent such as α-methylstyrene, 2-methylstyrene, 3-methylstyrene, 4-methylstyrene, 2,4-diisopropylstyrene, 2,4-dimethylstylene, 4-t-butylstyrene, and 5-t-butyl-2-methylstyrene; styrenes having a halogen atom as a substituent such as 4-chlorostyrene, dichlorostyrene, and 4-monofluorostyrene; styrenes having an alkoxy group of 1 to 6 carbon atoms as a substituent such as 4-methoxystyrene; styrenes having an aryl group as a substituent such as 4-phenyl styrene; and vinyl naphthalenes such as 1-vinylnaphthalene and 2-vinylnaphthalene. Among these, from the viewpoint of hygroscopicity, an aromatic vinyl compound containing no polar group such as styrene and styrenes having an alkyl group of 1 to 6 carbon atoms as a substituent, are preferable, and styrene is particularly preferable from the viewpoint of good industrial availability.

[2.3.4. Chain Conjugated Diene-Based Compound]

Examples of the chain conjugated diene-based compounds may include 1,3-butadiene, isoprene, 2,3-dimethyl-1,3-butadiene, and 1,3-pentadiene. Among these, from the viewpoint of hygroscopicity, a chain conjugated diene-based compound containing no polar group is preferable, and 1,3-butadiene and isoprene are particularly preferable from the viewpoint of easy availability in industry.

[2.3.5. Other Vinyl Compound]

Examples of other vinyl compounds may include a chain olefin compound, a cyclic olefin compound, an unsaturated cyclic anhydride, and an unsaturated imide compound. These compounds may have a nitrile group, an alkoxycarbonyl group, a hydroxycarbonyl group, or a halogen atom as a substituent.

Among these, from the viewpoint of hygroscopicity, those containing no polar group such as chain olefin compounds of 2 to 20 carbon atoms such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and cyclic olefin compounds of 5 to 20 carbon atoms per molecule such as vinylcyclohexane, 4-vinylcyclohexene, and norbornene are preferable. Chain olefin compounds of 2 to 20 carbon atoms per molecule are more preferable, and ethylene and propylene are particularly preferable.

[2.3.6. Block Copolymer [C]]

In a preferred example, the number of the polymer block [A] and the polymer block [B] contained in one molecule of the block copolymer [C] is usually such that the number of the polymer block [A] is two and the number of the polymer block [B] is one. Therefore, the block copolymer [C] usually has a triblock structure of [A]-[B]-[A]. However, the block copolymer [C] is not limited to those having a triblock structure, and may have a pentablock structure of [A]-[B]-[A]-[B]-[A], for example.

When the block copolymer [C] has two or more polymer blocks [A], they may be the same as or different from each other. The weight-average molecular weights of the two polymer blocks [A] contained in one molecule of the block copolymer [C] may be the same as or different from each other. The weight-average molecular weights Mw(A) of the polymer blocks [A] are each 3,000 to 90,000, preferably 3,500 to 80,000, and more preferably 4,000 to 60,000.

When the Mw(A) of the polymer block [A] is equal to or more than 3,000, the mechanical strength of the hydrogenated product [D] of the block copolymer can be improved. On the other hand, when the Mw(A) of the polymer block [A] is equal to or less than 90,000, the melt moldability of the hydrogenated product [D] of the block copolymer can be improved.

In the block copolymer [C], it is preferable that the weight fraction wA of the total of the polymer block [A] in the block copolymer [C] and the weight fraction wB of the polymer block [B] in the block copolymer [C] have a specific ratio. That is, the ratio of wA to wB (wA/wB) is preferably 50/50 or more, more preferably 53/47 or more, and still more preferably 57/43 or more, and is preferably 75/25 or less, more preferably 70/30 or less, and still more preferably 65/35 or less. When wA/wB is equal to or less than the aforementioned upper limit, flexibility and good mechanical strength can be imparted to the hydrogenated product [D] of the block copolymer. When wA/wB is equal to or more than the aforementioned lower limit, good heat resistance can be imparted.

The molecular weight of the block copolymer [C] is preferably 60,000 or more, more preferably 65,000 or more, and still more preferably 70,000 or more, and is preferably 150,000 or less, more preferably 130,000 or less, and still more preferably 100,000 or less, in terms of polystyrene-equivalent weight-average molecular weight (Mw) as measured by gel permeation chromatography (GPC) using tetrahydrofuran (THF) as a solvent. The molecular weight distribution (Mw/Mn) of the block copolymer [C] is preferably 3 or less, more preferably 2 or less, and particularly preferably 1.5 or less.

The block copolymer [C] may be produced using a monomer mixture (a) containing as a main component an aromatic vinyl compound, and a monomer mixture (b) containing as a main component a chain conjugated diene-based compound, or containing as main components an aromatic vinyl compound and a chain conjugated diene-based compound. For example, the block copolymer [C] may be produced by a method of alternately polymerizing the monomer mixture (a) and the monomer mixture (b) by a method such as living anionic polymerization; a method of polymerizing the monomer mixture (a) and the monomer mixture (b) in order, and then coupling the terminals of the polymer blocks [B] to each other by a coupling agent; or the like.

When the monomer mixture (b) contains an aromatic vinyl compound and a chain conjugated diene-based compound as main components, it is preferable to continuously supply the monomer mixture (b) to the polymerization reaction system in small amounts in the step of polymerizing the monomer mixture (b) to form the copolymer block [B]. Even when the polymerization rates of the aromatic vinyl compound and the chain conjugated diene compound are greatly different from each other, a copolymer block [B] having a uniform monomer composition can be formed by such a manner. This can improve the heat resistance of the hydrogenated product [D] of the block copolymer.

[2.3.7. Hydrogenated Product [D] of Block Copolymer]

The hydrogenated product [D] of the block copolymer may be obtained by hydrogenating the carbon-carbon unsaturated bonds of the main and side chains of the block copolymer [C] and the carbon-carbon unsaturated bonds of the aromatic ring.

The hydrogenation rate of the hydrogenated product [D] of the block copolymer (the ratio of hydrogenated unsaturated bonds in the hydrogenated product [D] of the block copolymer relative to all unsaturated bonds in the block copolymer [C]) is preferably 90% or more, preferably 95% or more, and more preferably 99% or more. The higher the hydrogenation rate, the better the weather resistance, heat resistance and transparency of the molded article. The hydrogenation rate of the hydrogenated product [D] of the block copolymer may be obtained by $^1$H-NMR or comparison of the peak areas by a UV detector and an RI detector in GPC. Specifically, $^1$H-NMR may be performed in the same manner as the measurement of the hydrogenation rate of the polymer ($\beta$) and the polymer ($\delta$) described above.

The hydrogenation method of the unsaturated bond, the reaction form, and the like are not particularly limited, and may be performed according to a known method. A hydrogenation method capable of increasing the hydrogenation rate and reducing the polymer chain cleavage reaction is preferable. Examples of such hydrogenation methods may include the method described in International Publication No. 2011/096389 and the method described in International Publication No. 2012/043708.

After the hydrogenation reaction is completed, the hydrogenation catalyst and/or the polymerization catalyst may be removed from the reaction solution, and then the hydrogenated product [D] of the block copolymer may be collected from the obtained solution. The hydrogenated product [D] of the block copolymer is usually shaped into pellets and may be subjected to further operation.

The molecular weight of the hydrogenated product [D] of the block copolymer is preferably 50,000 or more, more preferably 55,000 or more, and still more preferably 60,000 or more, and is preferably 150,000 or less, more preferably 130,000 or less, and still more preferably 100,000 or less, in terms of polystyrene-equivalent weight-average molecular weight (Mw) as measured by GPC using THF as a solvent. The molecular weight distribution (Mw/Mn) of the hydrogenated product [D] of the block copolymer is preferably 3 or less, more preferably 2 or less, and particularly preferably 1.5 or less. When Mw and Mw/Mn fall within the aforementioned respective ranges, heat resistance and mechanical strength in terms of a change in the phase difference of the molded A layer are favorable.

[2.4. Ratio of Alicyclic Structure-Containing Polymer]

The ratio of the alicyclic structure-containing polymer in the alicyclic structure-containing polymer resin constituting the A layer is preferably 50% by weight or more, more preferably 70% by weight or more, and particularly preferably 90% by weight or more. When the ratio of the alicyclic structure-containing polymer falls within this range, advantages of the alicyclic structure-containing polymer such as high mechanical strength and good optical properties can be obtained.

[2.5. Optional Component]

The alicyclic structure-containing polymer resin constituting the A layer may contain optional components other than the alicyclic structure-containing polymer. Examples of the optional components may include additives such as a cross-linking aid; stabilizers such as an antioxidant, an ultraviolet absorber, a light stabilizer; resin modifiers such as a lubricant and a plasticizer; colorants such as a dye and a pigment; and an antistatic agent. One type of these additives may be solely used, and two or more types thereof may also be used in combination, and the added amount thereof is appropriately selected within a range that does not impair the object of the present invention.

[2.6. Molding of a Layer Film]

As a material for producing the multilayer optical film of the present invention, a film of the A layer (hereinafter, which may sometimes be referred to simply as an "A layer film") may be obtained by molding any of the various alicyclic structure-containing polymer resins described above into the shape of a film.

The method of molding the film is not particularly limited, and a known method such as melt extrusion molding may be employed.

The A layer film may be used as it is after being molded by melt extrusion molding or the like, or may be further subjected to stretching.

When the A layer film is a stretched film, the stretching mode applied to the pre-stretch film may be any mode such as uniaxial stretching, biaxial stretching, or the like. When the pre-stretch film is a long-length film, the direction of stretching may be any of a longitudinal direction (a direction parallel to the lengthwise direction of the long-length film), a transverse direction (a direction parallel to the widthwise direction of the long-length film), and an oblique direction (a direction which is neither the longitudinal direction nor the transverse direction).

When the A layer film is a stretched film, the stretching ratio of the stretch applied to the pre-stretch film is preferably 1.1 times or more, and more preferably 1.5 times or more, and is preferably 7 times or less, and more preferably 6 times or less. The stretching temperature is preferably 80° C. or higher, and more preferably 100° C. or higher, and is preferably 200° C. or lower, and more preferably 180° C. or lower.

[2.7. Shape and Properties of A Layer]

The multilayer optical film of the present invention is preferably a long-length film, and thus the A layer is also preferably a long-length film.

The thickness of the A layer is not particularly limited, and may be a desired thickness required when the A layer is used as an optical film. Specifically, the thickness of the A layer is preferably 1 µm or more, and more preferably 5 µm or more, and is preferably 200 µm or less, and more preferably 150 µm or less.

The A layer may have anisotropy, or may have substantially no anisotropy but have isotropy, depending on its application. For example, the in-plane retardation Re of the A layer may be appropriately set in the range of 0 to 600 nm. The retardation Rth in the thickness direction of the A layer may be appropriately set in the range of 0 to 1000 nm. According to the present invention, since the optical properties of the A layer can be easily measured even in the state of the multilayer optical film together with the B layer, the quality control of the optical properties of the A layer can be easily performed.

The glass transition temperature of the A layer is not particularly limited, but is preferably 90° C. or higher, and more preferably 100° C. or higher, and is preferably 200° C. or lower, and more preferably 190° C. or lower. When the A layer has a glass transition temperature in such a range, it is possible to make the A layer suitable for processing and use as an optical film, and it is possible to easily perform the step of forming the B layer on the surface of the A layer.

[3. B Layer]

The B layer in the multilayer optical film of the present invention functions as the masking layer. That is, the B layer functions as a layer that prevents the undesirable phenomena such as the blocking by avoiding a direct contact of the adjoining A layers inside the wound body when the multilayer optical film of the present invention is formed as the wound body. When the multilayer optical film is unwound from the wound body to use the A layer as the optical film, the B layer may be peeled off from the A layer at any appropriate stage after the multilayer optical film is unwound. The peeled B layer may be discarded or reused by an appropriate means.

The B layer is a cured product of the material Y containing a dispersion of a crosslinkable polymer (a) and solid particles (b).

The crosslinkable polymer (a) is a polymer having a crosslinkable group. Examples of the crosslinkable group may include a methylol group, a vinyl group, an epoxy group, and combinations thereof, among which a methylol group is preferable. The number of the crosslinkable group in the crosslinkable polymer (a) may be appropriately adjusted to obtain the B layer having desired properties. For example, the number of the crosslinkable group in the crosslinkable polymer (a) is preferably $1.0 \times 10^{-5}$ mol/g or more, and more preferably $3.0 \times 10^{-5}$ mol/g or more, and is preferably $1.0 \times 10^{-3}$ mol/g or less, and more preferably $1.0 \times 10^{-4}$ mol/g or less.

The crosslinkable polymer (a) may contain a crosslinkable unit. The crosslinkable unit refers to a polymer unit having a crosslinkable group. The crosslinkable polymer (a) may be produced by polymerizing a monomer composition (a) containing a crosslinkable monomer (i.e., a monomer having a crosslinkable group). Examples of the crosslinkable monomer may include N-methylolacrylamide, divinylbenzene, glycidyl acrylate, and glycidyl methacrylate. Among these, N-methylolacrylamide is preferable. The ratio of the crosslinkable unit in the crosslinkable polymer (a) may be appropriately adjusted so as to obtain a desired number of crosslinkable groups. For example, the ratio of the crosslinkable unit in the crosslinkable polymer (a) is preferably 0.1% by weight or more, and more preferably 0.3% by weight or more, and is preferably 10% by weight or less, and more preferably 1.0% by weight or less.

The crosslinkable polymer (a) may contain an optional unit other than the crosslinkable unit. Examples of the optional unit may include a unit derived from a (meth)acrylate monomer, a unit derived from an α,β-unsaturated nitrile monomer, a unit derived from a (meth)acrylic acid monomer, and combinations of these. When these units are contained and the ratio thereof is appropriately adjusted, the B layer having desired properties can be obtained.

Examples of the (meth)acrylate monomers may include methyl acrylate, methyl methacrylate, ethyl acrylate, ethyl methacrylate, n-propyl acrylate, n-propyl methacrylate, n-butyl acrylate, n-butyl methacrylate, and combinations of these. The ratio of the unit derived from the (meth)acrylate monomer in the crosslinkable polymer (a) may be appropriately adjusted to obtain the B layer having desired properties. For example, the ratio of the unit derived from the (meth)acrylate monomer in the crosslinkable polymer (a) is preferably 77% by weight or more, and more preferably 80% by weight or more, and is preferably 98% by weight or less, and more preferably 95% by weight or less.

Examples of the $\alpha,\beta$-unsaturated nitrile monomer may include acrylonitrile, methacrylonitrile, and combinations of these. Acrylonitrile is particularly preferable. The ratio of the unit derived from the $\alpha,\beta$-unsaturated nitrile monomer in the crosslinkable polymer (a) may be appropriately adjusted to obtain the B layer having desired properties. For example, the ratio of the unit derived from the $\alpha,\beta$-unsaturated nitrile monomer in the crosslinkable polymer (a) is preferably 5% by weight or more, and more preferably 8% by weight or more, and is preferably 15% by weight or less, and more preferably 12% by weight or less.

Examples of the (meth)acrylic acid monomer may include acrylic acid, methacrylic acid, and combinations of these. The ratio of the unit derived from the (meth)acrylic acid monomer in the crosslinkable polymer (a) may be appropriately adjusted to obtain the B layer having desired properties. For example, the ratio of the unit derived from the (meth)acrylic acid monomer is preferably 0.5 part by weight or more, and more preferably 1.0 part by weight or more, and is preferably 2.0 parts by weight or less, and more preferably 1.5 parts by weight or less, relative to 100 parts by weight of the crosslinkable polymer (a).

The crosslinkable polymer (a) has a glass transition temperature of 0° C. or higher, and preferably 15° C. or higher, and is 40° C. or lower, and preferably 35° C. or lower. When the glass transition temperature is equal to or higher than the aforementioned lower limit, the B layer having little tackiness can be easily formed and handleability in winding and unwinding can be improved. When the glass transition temperature is equal to or lower than the aforementioned upper limit, the B layer can be imparted with sufficient flexibility and stably peeled off from the A layer.

The crosslinkable polymer (a) is present in the material Y as a dispersion. Specifically, the crosslinkable polymer (a) is present, in the material Y, in a particle shape having a volume-average particle diameter of 500 nm or less, and preferably 10 to 300 nm, and forms a latex with the solvent in the material Y. Having the crosslinkable polymer present as a dispersion in the material Y makes it possible to obtain the B layer having desired properties when the material Y is cured.

The solid particles (b) are particles that are present as solid matters in the material Y. Examples of the material of the solid particle (b) may include silica, alumina, and a mixture thereof.

A volume-average particle diameter db of the solid particles (b) preferably satisfies a specific relation with a film thickness tB of the B layer. Specifically, a ratio between db and tB, db/tB, is preferably 0.02 or more, more preferably 0.03 or more, and further more preferably 0.05 or more, and is preferably 0.3 or less, and more preferably 0.2 or less. When db/tB falls within such a range, a desirable effect of the present invention such as the effective prevention of the blocking can be easily obtained and the undesirable phenomena such as the orange peel can be reduced.

The material Y may include a solvent in addition to the crosslinkable polymer (a) present as a dispersion and the solid particles (b). Examples of the solvent may include water, methyl ethyl ketone, methanol, N-methylpyrrolidone, 2-propanol, and a mixture thereof. Among these, water is particularly preferable. The ratio of the solvent in the material Y may be appropriately adjusted such that the material Y exhibits properties suitable for forming the B layer. Specifically, the ratio may be appropriately adjusted such that a solid content concentration (a concentration of a residual component obtained by volatilizing the solvent from the material Y; including not only a component present as solid particles in the material Y, but also a non-volatile component dissolved in the material Y) of the material Y becomes 35 to 50% by weight.

The contact angle of the material Y on the A layer surface is preferably 30 degrees or less, and more preferably 28 degrees or less. When the contact angle is low, coating omission can be prevented, and thus, the B layer can be stably formed. The lower limit of the contact angle is not particularly limited, but it may be set to equal to or more than 0 degrees. In a case where the contact angle of the material Y on the A layer surface is high, the contact angle can be lowered by applying a surface treatment such as a corona treatment onto the A layer surface. However, when such a surface treatment is applied, an impurity matter may be generated due to the surface treatment and impair the optical performance of the multilayer optical film. In the present invention, by appropriately selecting the material constituting the A layer and the component of the material Y from those exemplified in the above description, such a low contact angle can be achieved without applying the surface treatment such as the corona treatment.

The B layer is a cured product of the material Y. The B layer may be easily formed by applying the material Y onto the surface of the A layer to form a layer of the material Y and curing the material Y. Specifically, in prior art masking using a masking film, a long-length masking film is formed separately from a long-length film to be protected and these films are bonded together with their lengthwise directions aligned. Implementation of these operations requires a manufacturing line for handling a plurality of the long-length films and bonding them together with their directions precisely aligned. In contrast, the production of the multilayer optical film of the present invention can be performed only by having an apparatus that conveys one film (the A layer), applies the material Y onto the film, and cures the material Y. Thus, the production can be performed by a relatively simple apparatus.

The coating of the material Y may be performed by using a coating device such as a die coater. The thickness of the layer of the material Y formed by the coating (wet thickness) may be appropriately adjusted so as to obtain a desired thickness of the B layer. Curing of the layer of the material Y may be performed by heating the layer of the material Y. The heating can achieve the curing of the layer of the material Y by volatilizing the solvent and forming a crosslinking through a reaction of a crosslinkable group. The heating conditions may be appropriately adjusted so as to achieve the curing. For example, the heating temperature may be set to 100 to 180° C. and the heating time may be set to 0.5 to 2 minutes. By adopting the layer of the cured product of the material Y thus prepared as the B layer, the masking layer having desired performance can be formed at a low cost.

When the curing is performed in this manner, the dispersion of the crosslinkable polymer (a) normally becomes the crosslinked cured product without preserving almost any particle shape as the dispersion in the B layer, while the solid particles (b) retain the same shape in the B layer as that the solid particles (b) have had when they have existed in the material Y. A fine concavo-convex shape may be formed due to the solid particles (b) on the surface of the B layer on the opposite side to the A layer (the surface 120U in FIG. 1). On the other hand, such a concavo-convex shape is not formed on the surface of the B layer on the side in contact with the A layer (the surface 120D in FIG. 1) and such a surface of the B layer is formed into a flat shape by following the shape of the surface 110U of the A layer 110. Thus, a problem such as transfer of formation of the orange peel or the like can be reduced.

Further, when the curing is performed in this manner, the B layer can be formed as a layer having a small phase difference in the multilayer optical film of the present invention. When the optical properties of the multilayer optical film are measured, the B layer having a small phase difference allows an easy measurement of the optical properties of a layer other than the B layer (specifically, the A layer). Thus, the B layer having a small phase difference makes it possible to easily measure and manage optical quality of the layer other than the B layer in a state of being masked. Specifically, the in-plane retardation Re of the B layer is preferably 0.5 nm or less, more preferably 0.4 nm or less, and ideally 0 nm. The retardation Rth of the B layer in the thickness direction is preferably −2 nm or more, and more preferably −1.5 nm or more, and is preferably 2 nm or less, and more preferably 1.5 nm or less. In order to obtain such a low phase difference, the multilayer optical film is produced preferably without subjecting the B layer to a step that changes the phase difference such as stretching after the material Y is cured.

The thickness tB of the B layer is 10 μm or more, and preferably 12 μm or more, and is 25 μm or less, and preferably 20 μm or less. The B layer having the thickness in such a range can have excellent masking performance and can be easily peeled off.

The tensile elastic modulus of the B layer is preferably 500 MPa or more, more preferably 600 MPa or more, further more preferably 1,000 MPa or more, and particularly more preferably 1,500 MPa or more, and is preferably 2,200 MPa or less, and more preferably 2,000 MPa or less. The B layer having the tensile elastic modulus within such a range can have excellent masking performance and can be easily peeled off. The method for measuring the tensile elastic modulus of the B layer may be in accordance with JIS K7127. The tensile elastic modulus within such a range may be obtained by appropriately selecting the material constituting the B layer from the materials exemplified in the above description.

The breaking elongation εB of the B layer is preferably 10% or more, and more preferably 20% or more, and is preferably 300% or less, and more preferably 200% or less. The B layer having the breaking elongation εB within such a range can be easily peeled off. The method for measuring the breaking elongation of the B layer may be in accordance with JIS K7127. The elongation within such a range may be obtained by appropriately selecting the material constituting the B layer from the materials exemplified in the above description.

[4. Multilayer Optical Film]

The multilayer optical film of the present invention may be composed of only one A layer and one B layer disposed on one surface of the A layer to be in direct contact therewith as in the example of the multilayer optical film 100 illustrated in FIG. 1. However, the multilayer optical film of the present invention is not limited to this example, and the number of each of the A layer and B layer in one multilayer optical film may be two or more. For example, the multilayer optical film of the present invention may have one A layer and two B layers disposed on both sides to be in direct contact therewith.

The size in the widthwise direction of the multilayer optical film of the present invention may be 500 to 2500 mm, for example. The length thereof may be, for example, 500 to 6000 m. The multilayer optical film of the present invention may preferably be stored by producing it as such a long-length shape and winding up it to form a wound body.

The total light transmittance of the multilayer optical film of the present invention is preferably 90% or more, and more preferably 91% or more. When the multilayer optical film has such a high total light transmittance, it is possible to easily measure the optical properties of layers other than the B layer (specifically, the A layer). Therefore, it is possible to easily measure and manage the optical quality of the layer other than the B layer while keeping a state of being masked. The total light transmittance may be measured in accordance with JIS K 7361, for example, using a haze meter ("NDH 4000" manufactured by Nippon Denshoku Industries Co., Ltd.). The total light transmittance within such a range may be obtained by appropriately selecting the materials constituting the A layer and the B layer from the materials exemplified in the above description.

The peeling strength between the A layer and the B layer in the multilayer optical film of the present invention is preferably 0.005 N/50 mm or more, and more preferably 0.01 N/50 mm or more, and is preferably 0.05 N/50 mm or less, and more preferably 0.04 N/50 mm or less. When the peeling strength falls within such a range, excellent masking can be achieved using the B layer and the B layer can be easily peeled off from the A layer. The peeling strength within such a range may be obtained by appropriately selecting the materials constituting the A layer and the B layer from the materials exemplified in the above description. Further, when the materials constituting the A layer and the B layer are appropriately selected from the materials exemplified in the above description, it becomes easy to obtain the multilayer optical film capable of maintaining the peeling strength within the above-mentioned range even after being stored for a long period of time as the wound body. The peeling strength between the A layer and the B layer may be measured by cutting the multilayer optical film to have a rectangular test piece of 50 mm in a widthwise direction and 200 mm in a lengthwise direction, peeling off the B layer from the A layer with a peeling direction of 180° and a peeling rate of 300 mm/min, and measuring a force required for the peeling using an appropriate measurement instrument (for example, a high performance digital force gauge ZP-5N manufactured by Imada Co., Ltd.).

[5. Use of A Layer Peeled from Multilayer Optical Film]

The A layer obtained by peeling off the B layer from the multilayer optical film of the present invention may be used as a member of various optical devices. For example, the A layer may be used as various optical members such as a protective film for protecting a polarizer layer in a polarizing plate and a phase-difference film.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" that represent quantity are on the basis of weight, unless otherwise specified. The operation described below was performed under the conditions of normal temperature and normal pressure, unless otherwise specified.

[Evaluation Methods]

[Glass Transition Temperature]

A sample was heated to 300° C. under a nitrogen atmosphere and then cooled rapidly in liquid nitrogen. The glass transition temperature Tg of the sample was obtained by raising the temperature at a rate of 10° C./min using a differential scanning calorimeter (DSC). In a case where the measurement object was a film, the measurement was performed with the film as it was as the sample. In a case where the measurement object was a latex in a liquid state, a dry film of the latex was produced, and the measurement was performed with the film as the sample. The dry film was produced by casting the latex in a glass mold and drying the latex while being allowed to stand for 48 hours in a constant-temperature and constant-humidity chamber having a temperature of 20° C. and a relative humidity of 65%.

[Peeling Strength Between B Layer and A Layer]

The long-length multilayer optical film was unwound from a winding terminal of the wound body of the multilayer optical film produced and test pieces were cut out from three places. The shape of each test piece was a rectangular shape of 50 mm in a widthwise direction and 200 mm in a lengthwise direction, and the cutting was performed such that the lengthwise direction of the test piece was coincident with the lengthwise direction of the multilayer optical film. Three positions to cut out the three test pieces were three places in the widthwise direction of the long-length multilayer optical film (the three places that were separated from each other with intervals in the width direction). The peeling strength was measured by peeling off the B layer from the A layer in each test piece. The peeling of the B layer was performed from one end to the other end of the test piece in the lengthwise direction with a peeling direction of 180° and a peeling rate of 300 mm/min. As the instrument for detecting the peeling strength, a high performance digital force gauge ZP-5N (manufactured by Imada Co., Ltd.) was used. An average value of the measurement results of the three test pieces was obtained as the peeling strength.

[Total Light Transmittance of Multilayer Optical Film]

The multilayer optical film was cut to obtain a 50 mm×50 mm sample. The total light transmittance of the sample was measured using NDH4000 (manufactured by Nippon Denshoku Industries Co., Ltd.) in accordance with JIS K7361.

[Thickness of Each Layer]

The multilayer optical film was cut to obtain a 50 mm×50 mm sample. The B layer was peeled off from the A layer in the sample, and the thickness of each layer was measured at four random places using a snap gauge (manufactured by Mitutoyo Corp.). An average value of the measurement results was obtained as the thickness.

[Phase Difference of Each Layer]

The multilayer optical film was cut to obtain a 50 mm×50 mm sample. The B layer was peeled off from the A layer in the sample, and the in-plane retardation Re and the thickness direction retardation Rth of each layer were measured at a measurement wavelength of 590 nm using an automatic birefringence analyzer ("KOBRA-21ADH" manufactured by Oji Scientific Instruments).

[Measurement of Contact Angle of Material Y on A Layer Surface]

The A layer film was cut to obtain a 100 mm×100 mm sample. A droplet of the material Y was dropped onto the A layer surface and the contact angle of the droplet was measured 3 seconds after the deposition of the droplet using a DropMaster (manufactured by Kyowa Interface Science Co., Ltd.) attached with a Teflon (registered trademark) coated 22G needle.

Production Example 1

To 30 parts of deionized water, a monomer mixture including 48.2 parts of ethyl acrylate, 40 parts of methyl methacrylate, 10 parts of acrylonitrile, 0.5 part of N-methylolacrylamide, and 1.3 parts of acrylic acid, and 0.3 part of sodium lauryl sulfate were added to obtain a mixture, and the mixture was stirred to obtain a monomer emulsion.

A glass reaction vessel equipped with a reflux condenser, a dropping funnel, a thermometer, a nitrogen inlet, and a stirrer were prepared, and 50 parts of deionized water was poured into the glass reaction vessel. Then, 10% by weight of the monomer emulsion obtained as in the above was added, and the temperature was then raised to 70° C. Then, while maintaining 70° C., 0.2 part of ammonium persulfate dissolved in 4 parts of deionized water was added to initiate the polymerization reaction. At the time point after 90 minutes from the start of the polymerization reaction, 0.1 part of ammonium persulfate dissolved in 2 parts of deionized water was added, and the remainder (90% by weight) of the monomer emulsion obtained in the above was slowly added over 5 hours. After completion of the addition, the temperature of the reaction vessel was raised to 80° C., and stirring was further continued for 4 hours. After that, the reaction was terminated by cooling to obtain a latex. The polymerization conversion rate at this time was 98% or more. A 10% ammonia aqueous solution was added to the latex to adjust the pH to 6.5, whereby a copolymer latex (A) was obtained. The glass transition temperature (Tg) of the obtained copolymer latex (A) was measured, and the glass transition temperature (Tg) was 35° C.

Production Example 2

In a stainless pressure-resistant reaction vessel equipped with a stirrer, 16 parts in terms of solid content of a seed latex (a latex of polymer particles having a particle diameter of 70 nm obtained by polymerizing 38 parts of styrene, 60 parts of 1,3-butadiene and 2 parts of methacrylic acid), 63.8 parts of styrene, 18 parts of 1,3-butadiene, 3.2 parts of methacrylic acid, 1.2 parts of sodium dodecyl diphenyl ether sulfonate, 0.3 part of formaldehyde condensate of sodium naphthalene sulfonate: 0.2 part of t-dodecyl mercaptan, 0.01 part of sodium ethylenediaminetetraacetate, 0.3 part of sodium bicarbonate, and 167 parts of ion-exchanged water were placed, and the mixture was stirred. Subsequently, the temperature inside the reaction vessel was raised to 50° C., and then 12 parts of 3% aqueous potassium persulfate solution was added to initiate the polymerization reaction.

When the polymerization conversion rate reached 50%, the reaction temperature was raised to 55° C. Further, when the polymerization conversion rate reached 90%, the reaction temperature was raised to 70° C. While maintaining the reaction temperature at 70° C., the polymerization reaction was continued for 8 hours. After that, 0.5 part of 5% aqueous solution of sodium nitrite was added to terminate the polymerization reaction, and unreacted monomers were removed to obtain a latex. After that, a 5% potassium hydroxide aqueous solution was added to adjust the pH of the latex to 9. Thereby, a copolymer latex (B) was obtained. The polymerization conversion rate at this time was 98% or more. The glass transition temperature (Tg) of the obtained copolymer latex (B) was measured, and the glass transition temperature (Tg) was 44° C.

Production Example 3

(P3-1) Production of Block Copolymer [C1]

270 Parts of dehydrated cyclohexane, 75 parts of dehydrated styrene, and 7.0 parts of dibutyl ether were placed in a reaction vessel which was equipped with a stirrer and inside air of which was sufficiently replaced with nitrogen. While stirring the entire contents at 60° C., 5.6 parts of n-butyllithium (15% cyclohexane solution) was added to initiate polymerization. Stirring of the entire contents of the mixture at 60° C. was continuously performed for 60 minutes. The reaction temperature was maintained at 60° C. until the reaction stopped. At this time point (polymerization first step), the reaction liquid was analyzed by gas chromatography (hereinafter sometimes described as "GC") and GPC. As a result, the polymerization conversion rate was 99.4%.

Subsequently, 15 parts of dehydrated isoprene was continuously added to the reaction liquid over 40 minutes, and after completion of the addition, stirring was continued for 30 minutes. At this time point (polymerization second stage), the reaction liquid was analyzed by GC and GPC, and as a result, the polymerization conversion rate was 99.8%.

After that, 10 parts of dehydrated styrene was continuously added to the reaction liquid over 30 minutes, and after completion of the addition, stirring was continued for 30 minutes. At this time point (polymerization third step), the reaction liquid was analyzed by GC and GPC, and as a result, the polymerization conversion rate was almost 100%.

1.0 part of isopropyl alcohol was added at this stage to terminate the reaction, thereby obtaining a polymer solution containing the block copolymer [C1] of the [A1]-[B]-[A2] type. In the obtained block copolymer [C1], Mw[C1]=82,400, Mw/Mn was 1.32, and wA:wB=85:15.

(P3-2) Production of Hydrogenated Block Copolymer [D1]

The polymer solution obtained in (P3-1) was transferred to a pressure-resistant reaction vessel equipped with a stirrer, and 4.0 parts of a diatomaceous earth supported nickel catalyst (product name "E22U", nickel carrying amount 60%, manufactured by JGC C&C) as a hydrogenation catalyst and 30 parts of dehydrated cyclohexane were added and mixed. The inside air of the reaction vessel was replaced with hydrogen gas. Hydrogen was further supplied while the solution was stirred, and hydrogenation reaction was carried out at a temperature of 190° C. and a pressure of 4.5 MPa for 6 hours.

The reaction solution obtained by the hydrogenation reaction contained the hydrogenated block copolymer [D1]. Mw[D1] of the hydrogenated block copolymer was 71,800, the molecular weight distribution Mw/Mn was 1.30, and the hydrogenation rate was almost 100%.

After completion of the hydrogenation reaction, the reaction solution was filtered to remove the hydrogenation catalyst, and then 2.0 parts of a xylene solution in which 0.3 part of pentaerythrityl tetrakis[3-(3,5-di-t-butyl-4-hydroxyphenyl)propionate] (product name "AO 60", manufactured by ADEKA CORPORATION) as a phenolic antioxidant had been dissolved was added and dissolved to prepare a solution.

Subsequently, the aforementioned solution was treated at a temperature of 260° C. and a pressure of 0.001 MPa or less using a cylindrical condenser/dryer (product name "CONTRO", manufactured by Hitachi, Ltd.), and cyclohexane, xylene, and other volatile components were removed from the solution to obtain a molten resin. This resin was extruded from a die in a form of strands, cooled, and pelletized in a form of pellets by a pelletizer. Thus, 95 parts of the resin [D1] pellets containing the hydrogenated block copolymer [D1] was produced.

The hydrogenated block copolymer [D1] in the obtained resin [D1] had Mw[D1]=68,500, Mw/Mn=1.30, and Ts=139° C.

Example 1

(1-1. Preparation of Material Y)

As the solid particles, particles of amorphous silicon dioxide (trade name "Sylysia 310P", manufactured by Fuji Silysia Chemical Ltd., a volume-average particle diameter of 2.7 μm) were prepared. The solid particles and ion exchange water were mixed to obtain an aqueous dispersion of the solid particles with a solid content concentration of 0.25%. The aqueous dispersion of the solid particles thus obtained and the copolymer latex (A) obtained as the crosslinkable polymer in Production Example 1 were mixed to obtain an aqueous resin composition in a liquid state with a solid content of 41%. The aqueous resin composition was used as the material Y.

(1-2. Production of A Layer Film)

Pellets of a resin containing an amorphous alicyclic structure-containing polymer (a glass transition temperature of 160° C.; "ZEONOR" manufactured by ZEON Corporation) were dried at 100° C. for 5 hours. Subsequently, the dried resin pellets were supplied to a single screw extruder. The resin was heated and melted in the extruder. Then the resin was passed through a polymer pipe and a polymer filter and extruded from a T-die in a sheet form on a casting drum to be cooled. In this manner, a long-length A layer film made of the alicyclic structure-containing polymer resin having a thickness of 30 μm and a width of 1,500 mm was obtained.

The contact angle of the material Y on the A layer surface was measured, and found to be 26 degrees.

(1-3. Production and Evaluation of Multilayer Optical Film)

The material Y obtained in (1-1) was applied onto one surface of the A layer film obtained in (1-2) using a slot die coater to form a layer of the material Y having a wet thickness of 25 μm. The applied product was passed through a floating-type drying oven set to 125° C. to dry and cure the layer of the material Y. In this manner, a B layer was formed on the A layer film, to thereby obtain a multilayer optical film. The thickness of the A layer was 30 μm, the thickness of the B layer was 10 μm, and the width of the multilayer optical film was 1,500 mm. The multilayer optical film thus obtained was wound to form the wound body.

The multilayer optical film thus obtained was evaluated. Re and Rth of the B layer were 0.04 nm and −0.7 nm, respectively. Re and Rth of the A layer were 2 nm and 6 nm, respectively. Further, the tensile elastic modulus and the breaking elongation of the B layer were 1,760 MPa and 30%, respectively. The peeling strength between the A layer and the B layer was 0.011 N/50 mm. The total light transmittance and db/tB of the multilayer optical film were 91.9% and 0.27, respectively.

When the B layer of the multilayer optical film thus obtained was peeled off while being continuously unwound from a roll, the B layer was stably peelable.

Example 2

A wound body of a multilayer optical film was obtained in the same manner as that of Example 1 except that the particles of amorphous silicon dioxide were changed to particles of another amorphous silicon dioxide (trade name "Seahoster-KE-P150", manufactured by Nippon Shokubai Co., Ltd., a volume-average particle diameter of 1.5 μm) in (1-1). The multilayer optical film thus obtained included the A layer having a thickness of 30 μm and the B layer having a thickness of 10 μm, and had a width of 1,500 mm.

The A layer and the multilayer optical film thus obtained were evaluated. Re and Rth of the B layer were 0.05 nm and −0.9 nm, respectively. Re and Rth of the A layer were 2 nm and 6 nm, respectively. Further, the tensile elastic modulus and the breaking elongation of the B layer were 1,760 MPa and 30%, respectively. The peeling strength between the A layer and the B layer was 0.01 N/50 mm. The total light transmittance and db/tB of the multilayer optical film were 92% and 0.15, respectively. The contact angle of the material Y on the A layer surface was 26 degrees.

When the B layer of the multilayer optical film thus obtained was peeled off while being continuously unwound from a roll, the B layer was stably peelable.

Example 3

A wound body of a multilayer optical film was obtained in the same manner as that of Example 1 except that the wet thickness obtained by the application of the material Y was changed to 40 μm in (1-3). The multilayer optical film thus obtained included the A layer having a thickness of 30 μm and the B layer having a thickness of 16 μm, and had a width of 1,500 mm.

The A layer and the multilayer optical film thus obtained were evaluated. Re and Rth of the B layer were 0.06 nm and −1.1 nm, respectively. Re and Rth of the A layer were 2 nm and 6 nm, respectively. Further, the tensile elastic modulus and the breaking elongation of the B layer were 1,700 MPa and 35%, respectively. The peeling strength between the A layer and the B layer was 0.011 N/50 mm. The total light transmittance and db/tB of the multilayer optical film were 91.7% and 0.17, respectively. The contact angle of the material Y on the A layer surface was 26 degrees.

When the B layer of the multilayer optical film thus obtained was peeled off while being continuously unwound from a roll, the B layer was stably peelable.

Example 4

A wound body of a multilayer optical film was obtained in the same manner as that of Example 1 except that the resin containing the amorphous alicyclic structure-containing polymer (a glass transition temperature of 160° C.; "ZEONOR" manufactured by Zeon Corp.) was changed to the resin [D1] obtained in Production Example 3 in (1-2) and the wet thickness obtained by the application of the material Y was changed to 40 μm in (1-3). The multilayer optical film thus obtained included the A layer having a thickness of 30 μm and the B layer having a thickness of 16 μm, and had a width of 1,500 mm.

The A layer and the multilayer optical film thus obtained were evaluated. Re and Rth of the B layer were 0.06 nm and −1.1 nm, respectively. Re and Rth of the A layer were 0.1 nm and 0.2 nm, respectively. Further, the tensile elastic modulus and the breaking elongation of the B layer were 1,700 MPa and 35%, respectively. The peeling strength between the A layer and the B layer was 0.011 N/50 mm. The total light transmittance and db/tB of the multilayer optical film were 91.7% and 0.17, respectively. The contact angle of the material Y on the A layer surface was 26 degrees.

When the B layer of the multilayer optical film thus obtained was peeled off while being continuously unwound from a roll, the B layer was stably peelable.

Example 5

A wound body of a multilayer optical film was obtained in the same manner as that of Example 1 except that the particles of amorphous silicon dioxide were changed to particles of another amorphous silicon dioxide (trade name "Seahoster-KE-P100", manufactured by Nippon Shokubai Co., Ltd., a volume-average particle diameter of 1.0 μm) in (1-1). The multilayer optical film thus obtained included the A layer having a thickness of 30 μm and the B layer having a thickness of 10 μm, and had a width of 1,500 mm.

The A layer and the multilayer optical film thus obtained were evaluated. Re and Rth of the B layer were 0.05 nm and −0.9 nm, respectively. Re and Rth of the A layer were 2 nm and 6 nm, respectively. Further, the tensile elastic modulus and the breaking elongation of the B layer were 1,750 MPa and 30%, respectively. The peeling strength between the A layer and the B layer was 0.01 N/50 mm. The total light transmittance and db/tB of the multilayer optical film were 92% and 0.06, respectively. The contact angle of the material Y on the A layer surface was 26 degrees.

When the B layer of the multilayer optical film thus obtained was peeled off while being continuously unwound from a roll, the B layer was stably peelable.

Comparative Example 1

A wound body of a multilayer optical film was obtained in the same manner as that of Example 1 except that matters listed below were changed.

The copolymer latex (B) obtained in Production Example 2 was used instead of the copolymer latex (A) in (1-1).

As the contact angle of the material Y on the A layer surface was 71 degrees and wettability of the surface as it was was thus insufficient for carrying out application, the surface of the A layer film to be subjected to application process was previously subjected to a corona treatment with an output power of 0.3 kW prior to the application of the material Y in (1-3).

The total light transmittance of the multilayer optical film was 89%. In an attempt to peel off the B layer from the A layer in the multilayer optical film thus obtained, the B layer cracked and could not be peeled off as a film.

Comparative Example 2

A wound body of a multilayer optical film was obtained in the same manner as that of Example 1 except that the wet thickness obtained by the application of the material Y was changed to 7 μm in (1-3).

The multilayer optical film thus obtained included the A layer having a thickness of 30 μm and the B layer having a thickness of 3 μm, and had a width of 1,500 mm.

The A layer and the multilayer optical film thus obtained were evaluated. Re and Rth of the B layer were 0.02 nm and −0.3 nm, respectively. Re and Rth of the A layer were 2 nm and 6 nm, respectively. The total light transmittance and db/tB of the multilayer optical film were 91.8% and 0.90, respectively. The contact angle of the material Y on the A layer surface was 26 degrees. In an attempt to peel off the B layer from the A layer in the multilayer optical film thus obtained, the film cracked and the peeling strength could not be stably measured.

Comparative Example 3

An attempt to produce a multilayer optical film was made in the same manner as that of Example 1 except that the wet thickness obtained by the application of the material Y was changed to 70 μm in (1-3). However, the material Y layer could not be sufficiently cured, and thus, the B layer could not be formed.

Comparative Example 4

A wound body of a multilayer optical film was obtained in the same manner as that of Example 1 except that the particles of amorphous silicon dioxide were not added in (1-1). That is, in (1-1), ion exchange water and the latex of the acrylate polymer were mixed to obtain an aqueous liquid resin composition with a solid content of 41% as the material Y. This composition was used as the material Y.

The multilayer optical film thus obtained included the A layer having a thickness of 30 μm and the B layer having a thickness of 10 μm, and had a width of 1,500 mm. The total light transmittance and db/tB of the multilayer optical film were 92% and 0, respectively. The contact angle of the material Y on the A layer surface was 26 degrees.

An attempt to evaluate the multilayer optical film thus obtained was made. When the film was unwound from a roll, a blocking between the surface of the multilayer optical film on the B layer side and the surface of the adjacent multilayer optical film on the A layer side in the wound body was observed.

Comparative Example 5

A wound body of a multilayer optical film was obtained in the same manner as that of Example 1 except that the wet thickness obtained by the application of the material Y was changed to 20 μm in (1-3). The multilayer optical film thus obtained included the A layer having a thickness of 30 μm and the B layer having a thickness of 8 μm, and had a width of 1,500 mm.

The A layer and the multilayer optical film thus obtained were evaluated. Re and Rth of the B layer were 0.03 nm and −0.5 nm, respectively. Re and Rth of the A layer were 2 nm and 6 nm, respectively. Further, the tensile elastic modulus and the breaking elongation of the B layer were 1,740 MPa and 15%, respectively. The peeling strength between the A layer and the B layer was 0.01 N/50 mm. The total light transmittance and db/tB of the multilayer optical film were 91.7% and 0.34, respectively. The contact angle of the material Y on the A layer surface was 26 degrees.

When the B layer of the multilayer optical film thus obtained was peeled off while being continuously unwound from a roll, the B layer cracked while being unwound and could not be stably peeled off.

Comparative Example 6

A wound body of a multilayer optical film was obtained in the same manner as that of Example 1 except that the wet thickness obtained by the coating of the material Y was changed to 15 μm in (1-3). The multilayer optical film thus obtained included the A layer having a thickness of 30 μm and the B layer having a thickness of 6 μm, and had a width of 1,500 mm.

The A layer and the multilayer optical film thus obtained were evaluated. Re and Rth of the B layer were 0.03 nm and −0.4 nm, respectively. Re and Rth of the A layer were 2 nm and 6 nm, respectively. Further, the tensile elastic modulus and the breaking elongation of the B layer were 1,780 MPa and 14%, respectively. The peeling strength between the A layer and the B layer was 0.01 N/50 mm. The total light transmittance and db/tB of the multilayer optical film were 91.7% and 0.45, respectively. The contact angle of the material Y on the A layer surface was 26 degrees.

When the B layer of the multilayer optical film thus obtained was peeled off while being continuously unwound from a roll, the B layer cracked while being unwound and could not be stably peeled off.

REFERENCE SIGN LIST

100: multilayer optical film
110: A layer
110D: surface on the A layer side of the multilayer optical film
110U: surface on a side of A layer
120: B layer
120D: surface of B layer on a side in contact with A layer
120U: surface of multilayer optical film on the B layer side
121: cured product of crosslinkable polymer (a)
122: solid particles (b)

The invention claimed is:

1. A method of producing a multilayer optical film including:
   an A layer formed of an alicyclic structure-containing polymer resin; and
   a B layer disposed on at least one surface of the A layer to be in direct contact therewith, the B layer being a single layer and an outermost layer of the multilayer optical film and serving as a masking layer, wherein
   the B layer is a cured product of a material Y including a dispersion of a crosslinkable polymer (a) and solid particles (b),
   the B layer has a thickness tB of 10 μm or more and 25 μm or less,
   the crosslinkable polymer (a) has a glass transition temperature of 0° C. or higher and 40° C. or lower and has a particle shape having a volume-average particle diameter of 500 nm or less, and
   a peeling strength between the A layer and the B layer is 0.005 N/50 mm or more and 0.05 N/50 mm or less,
   the method comprising the steps of:

applying the material Y including the dispersion of the crosslinkable polymer (a), and the solid particles (b) onto a surface of the A layer, to form a layer of the material Y; and curing the layer of the material Y.

2. The method according to claim 1, wherein the solid particles (b) is particles of a material selected from the group consisting of silica, alumina, and a mixture thereof.

3. The method according to claim 1, wherein the solid particles (b) have a volume-average particle diameter db satisfying a relationship of $0.02 \leq db/tB \leq 0.3$.

4. The method according to claim 1, wherein the crosslinkable polymer (a) contains a crosslinkable group selected from the group consisting of a methylol group, a vinyl group, an epoxy group, and a combination thereof.

5. The method according to claim 1, wherein the B layer has a tensile elastic modulus EB satisfying $500 \text{ MPa} \leq EB \leq 2,200 \text{ MPa}$.

6. The method according to claim 1, wherein the B layer has a breaking elongation $\varepsilon B$ satisfying $10\% \leq \varepsilon B \leq 300\%$.

7. The method according to claim 1, wherein a contact angle of the material Y on a surface of the A layer is 30 degrees or less.

8. The method according to claim 1, wherein the crosslinkable polymer (a) has the glass transition temperature of 15° C. or higher and 40° C. or lower.

9. The method according to claim 1, further comprising peeling off the B layer from the A layer to obtain an optical member.

10. A method of using a cured product of a crosslinkable polymer and solid particles as a masking layer of a multilayer optical film, wherein the multilayer optical film includes:

an optical film layer formed of an alicyclic structure-containing polymer resin, the masking layer disposed on at least one surface of the optical film layer to be in direct contact therewith, the masking layer is a single layer and an outermost layer of the multilayer optical film, the masking layer has a thickness of 10 μm or more and 25 μm or less, the crosslinkable polymer has a glass transition temperature of 15° C. or higher and 40° C. or lower and has a particle shape having a volume-average particle diameter of 500 nm or less, and a peeling strength between the optical film layer and the masking layer is 0.005 N/50 mm or more and 0.05 N/50 mm or less, the method comprising:

mixing the crosslinkable polymer and the solid particles to obtain an aqueous resin composition in a liquid state, applying the aqueous resin composition onto the at least one surface of the optical film layer, to form a layer of the aqueous resin composition; and curing the layer of the aqueous resin composition to form the masking layer.

11. The method according to claim 10, further comprising peeling off the masking layer from the optical film layer to obtain an optical member.

12. A method of applying a peelable masking film onto an optical film, the method comprising:

preparing an optical film made of an alicyclic structure-containing polymer resin, mixing a crosslinkable polymer and solid particles to obtain an aqueous resin composition in a liquid state, the crosslinkable polymer having a glass transition temperature of 15° C. or higher and 40° C. or lower and having a particle shape having a volume-average particle diameter of 500 nm or less, applying the aqueous resin composition onto at least one surface of the optical film, and curing the aqueous resin composition on the optical film to form the peelable masking film as a single layer and an outermost layer having a thickness of 10 μm or more and 25 μm or less in direct contact with the optical film and having a peeling strength from the optical film layer of 0.005 N/50 mm or more and 0.05 N/50 mm or less.

13. The method according to claim 12, further comprising peeling off the peelable masking film from the optical film to obtain an optical member.

* * * * *